United States Patent
Krumm et al.

Patent Number: 5,581,928
Date of Patent: Dec. 10, 1996

[54] GUN BARREL HAVING AN EROSION-REDUCING LINING

[75] Inventors: Herbert Krumm, Kaarat; Wolfgang Böer, Düsseldorf; Karlheinz Reinelt, Celle, all of Germany

[73] Assignees: Rheinmetall Industrie GmbH, Ratingen; TZN Forschungs- und Entwicklungszentrum Unterlüss GmbH, Unterlüss, both of Germany

[21] Appl. No.: 409,595

[22] Filed: Mar. 24, 1995

[30] Foreign Application Priority Data

Mar. 25, 1994 [DE] Germany .......................... 44 10 325.5

[51] Int. Cl.⁶ .................................................. F41A 21/04
[52] U.S. Cl. ................. 42/76.01; 47/76.02; 89/8; 89/16
[58] Field of Search ................. 42/76.01, 76.02; 89/8, 16

[56] References Cited

U.S. PATENT DOCUMENTS

| H1365 | 11/1994 | Amspacker et al. | 42/76.02 |
| 3,613,499 | 10/1971 | Hubbard et al. | 89/8 |
| 3,768,191 | 10/1973 | Vassallo | 42/76.01 |
| 4,741,939 | 5/1988 | Marchetti et al. | 89/16 |
| 4,907,487 | 3/1990 | Tidman et al. | 89/8 |
| 4,957,035 | 9/1990 | Eskam et al. | 89/8 |
| 5,125,179 | 6/1992 | Campbell et al. | 42/76.02 |
| 5,191,165 | 3/1993 | Oskarsson et al. | 89/16 |
| 5,212,328 | 5/1993 | Petrovich | 42/76.02 |

FOREIGN PATENT DOCUMENTS

| 4105575 | 8/1992 | Germany . |
| 4107273 | 9/1992 | Germany . |

OTHER PUBLICATIONS

Ryan, J. W., Guns, Mortars & Rockets, p. 45 1982.
Hawley, Gessner G., The Condensed Chemical Dictionary, "nylon", 1971, p. 635.
Turchi, Peter J., Megagauss Physics and Technology, Hawke et al, "Magnet Propulsion Railguns: Their Design and Capabilities", 1980, pp. 297–311.

*Primary Examiner*—Michael J. Carone
*Attorney, Agent, or Firm*—Spencer & Frank

[57] ABSTRACT

A gun barrel has an erosion-reducing, electrically non-conductive lining extending along a length portion of the gun barrel. The lining is made of a polyimide.

16 Claims, 1 Drawing Sheet

5,581,928

GUN BARREL HAVING AN EROSION-REDUCING LINING

CROSS REFERENCE TO RELATED APPLICATION

This application claims the priority of German Application No. P 44 10 325.5 filed Mar. 25, 1994, which is incorporated herein by reference.

BACKGROUND OF THE INVENTION

The invention relates to a gun barrel having an erosion-reducing lining which consists, at least in a partial region of the gun barrel, of an electrically non-conductive material.

Usually, more or less severe erosion occurs in gun barrels over time, such erosion necessitating the replacement of the barrels after a certain erosion depth has been reached. To avoid such an erosion, for example, hard chrome coatings are known which, if required, may be provided with an additional layer having good anti-friction properties. Such an arrangement is disclosed in German published Application 41 07 273.

A metallic erosion protection, however, cannot be used, if the inside if the gun barrel must consist of an electrically non-conductive material which is often the case, for example, in electric or electrothermal cannons. In such cases, normally plastic barrels have to be used, particularly barrels made of a fiber reinforced plastic material, or a plastic lining has to be resorted to. The erosion resistance of these plastic barrels or linings, however, is low compared to corresponding erosion-reducing metal layers.

SUMMARY OF THE INVENTION

It is an object of the invention to provide an improved erosion-reducing lining made of an electrically non-conductive material, wherein the lining prevents an erosion of the gun barrel even at high pressures and temperatures such as usually occur in the operation of large-caliber guns.

This object and others to become apparent as the specification progresses, are accomplished by the invention, according to which, briefly stated, the gun barrel has an erosion-reducing, electrically non-conductive lining extending along a length portion of the gun barrel. The material of the lining is polyimide or polybenzimidazole or fiber glass reinforced polybenzimidazole or polyetheretherketone or fiber glass reinforced polyetheretherketone.

Such gun barrels may find advantageous use in electric cannons or hybrid cannons having an electric booster acceleration device provided in the gun barrel.

The above-listed materials used according to the invention have the property of changing directly from the solid state to the gaseous state at high temperatures (temperatures exceeding 500° C.). A relatively long time is required for this transformation process so that the only short-time friction at the barrel wall during the passage of the projectile as well as the relatively short-time emission of propellant gases do not attack the lining surface and, consequently, erosion does not occur. Tests conducted by applicant have shown that if polyimide was used, no erosion whatsoever could be ascertained at an internal pressure of 1300 bar, a flow velocity of the propellant gases of approx. 2000 m/s and a temperature of 1500°–2000° K.

Another advantage of using the above mentioned materials as an electrically non-conductive lining for gun barrels is their high stretchability. In spite of the very high pressures, in particular, in large-caliber guns, cracks therefore do not occur, contrary to, for example, purely ceramic linings.

Should erosion occur in spite of the linings according to the invention upon introduction of a very high energy into the gun barrel, the application of a non-conductive coating (such as a plasma-sprayed or flame-sprayed ceramic layer) on the linings according to the invention has proven to be advantageous.

In addition, the linings according to the invention can be used without a change in the material properties not only at high temperatures but also at temperatures below the freezing point.

The polyimide that is suitable for this use is produced, for example, by Du Pont de Nemours GmbH, Bad Homburg (Germany) under the trademark "Vespel".

DESCRIPTION OF THE PREFERRED EMBODIMENTS

Figure 1:
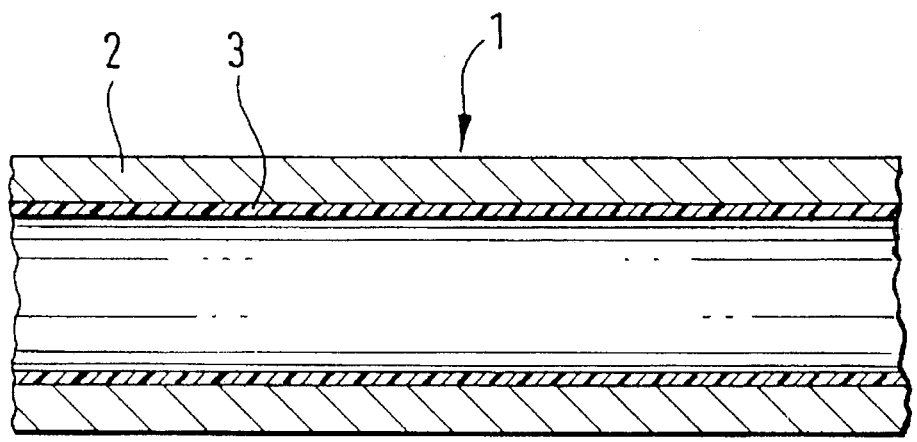
FIG. 1 is a schematic, axial sectional view of a gun barrel having a polyimide lining according to the invention.

FIG. 1 shows a gun barrel 1 for firing conventional ammunition. The gun barrel 1 comprises a steel barrel 2 and a thin lining 3 made of polyimide. The lining 3 can be glued, pressed or shrink-fitted into the steel barrel 2. To avoid high tangential stresses, shrink-fitting is particularly advantageous. Instead of steel, the gun barrel 1 may be made of a fiber composite material or a steel-plastics composite material.

Figure 2:
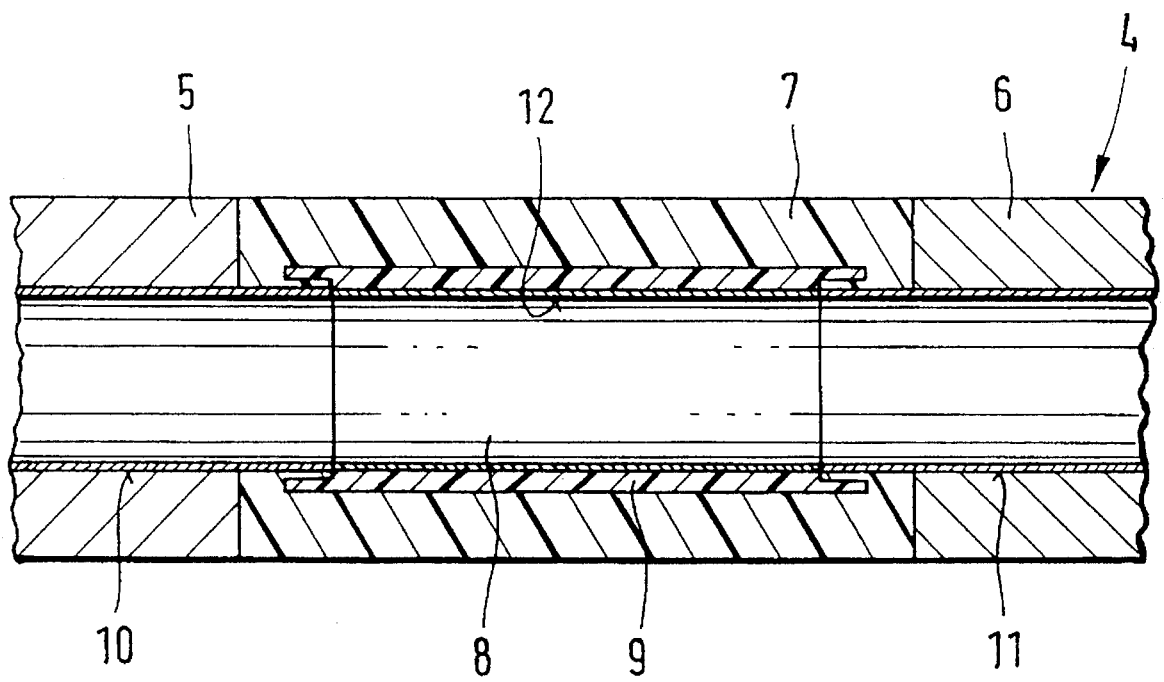
FIG. 2 is an axial sectional view of a hybrid-cannon barrel having a plasma section for the electrothermal acceleration of projectiles.

FIG. 2 shows a further embodiment of the invention. There is illustrated a gun barrel 4 of a hybrid gun in which a projectile is first conventionally accelerated by means of the propellant gases produced by the burning of powder. When the projectile passes through a plasma section in the gun barrel, an arc is ignited in the plasma section. The arc further heats the propellant gases and thus increases the internal pressure in the barrel.

In the gun illustrated in FIG. 2, the gun barrel 4 is comprised of two metal barrels 5, 6 which lie at different potentials and between which a barrel-shaped insulator 7 (acceleration device) is arranged, containing the plasma section 8. The plasma section 8 is, at the barrel, bounded by a non-conductive polyimide lining 9 which is connected to the insulator 7, for example, by press fitting. A relatively thin ceramic layer 12 is also sprayed on the polyimide lining 9.

A hard chrome layer 10 and 11 is provided in metal barrels 5, 6 for conventionally preventing erosion of the barrels 5 and 6. The insulator 7 may be a plastic material, such as a fiber composite material, or a barrel made of a steel-plastics composite material may also be used.

It will be understood that the above description of the present invention is susceptible to various modifications, changes and adaptations, and the same are intended to be comprehended within the meaning and range of equivalents of the appended claims.

What is claimed is:

1. In a gun barrel having an erosion-reducing, electrically non-conducting lining provided on an inner surface of the gun barrel and extending along a length portion of the gun barrel, the improvement wherein said lining consists essentially of a material selected from the group consisting of polyimide, polybenzimidazole, fiber glass reinforced polybenzimidazole, polyetheretherketone and fiber glass reinforced polyetheretherketone.

2. The gun barrel as defined in claim 1, wherein said lining is glued to the barrel.

3. The gun barrel as defined in claim 1, wherein said lining is press-fitted into the barrel.

4. The gun barrel as defined in claim 1, wherein said lining is shrink-fitted into the barrel.

5. The gun barrel as defined in claim 1, further comprising a coating provided on said lining.

6. The gun barrel as defined in claim 5, wherein said coating comprises a ceramic layer.

7. The gun barrel as defined in claim 1, wherein said length portion of said gun barrel is comprised of an insulating material selected from the group consisting of a fiber composite material and a steel-plastics composite material.

8. The gun barrel as defined in claim 7, wherein said length portion is a first length portion; said barrel further comprising second and third length portions made of steel and flanking said first length portion.

9. A gun barrel, comprising:

a barrel; and a lining which is erosion-reducing and electrically non-conductive, which is provided on the inner surface of the barrel and extends along at least a portion of the length of the barrel, and which consists essentially of a polyimide.

10. The gun barrel as defined in claim 9, wherein the lining is glued to the barrel.

11. The gun barrel as defined in claim 9, wherein the lining is press-fitted into the barrel.

12. The gun barrel as defined in claim 9, wherein the lining is shrink-fitted into the barrel.

13. The gun barrel as defined in claim 9, further comprising a coating provided on the lining on the surface thereof opposite the barrel.

14. The gun barrel as defined in claim 13, wherein the coating comprises a ceramic layer.

15. The gun barrel as defined in claim 9, wherein the portion of the length of the barrel which is provided with the lining is comprised of an insulating material selected from the group consisting of a composite material comprised of fiber, and a composite material comprised of steel and plastics.

16. The gun barrel as defined in claim 15, wherein the portion of the length of the barrel which is provided with the lining is a first length portion; and wherein the barrel further comprises second and third length portions which are comprised of steel and which flank the first length portion.

* * * * *